United States Patent Office 2,721,211
Patented Oct. 18, 1955

2,721,211

SUBSTITUTED PHENYLENEDIAMINES AND PROCESS OF PREPARING SAME

Saul Rex Buc, Easton, Pa., assignor to General Aniline & Film Corporation, New York, N. Y., a corporation of Delaware No Drawing. Application January 4, 1952,
Serial No. 265,043

15 Claims. (Cl. 260—562)

This invention relates to the preparation of phenylenediamine derivatives, and more particularly to the preparation of asymmetrically substituted phenylenediamine derivaties, wherein one amino group is alkylated or hydroxyalkylated and formylated and the other amino group is acylated to form an N-gluconyl derivative.

One object of my invention is to provide a new process for preparing N-alkyl (or N-hydroxyalkyl), N-formyl, N'-gluconyl phenylenediamines.

Another object of my invention is to provide a new process for preparing N-alkyl (or N-hydroxyalkyl), N-formyl, N'-gluconyl p-phenylenediamines.

Still another object of my invention is to provide a new process for preparing N-alkyl (or N-hydroxyalkyl), N-formyl, N'-gluconyl m-phenylenediamines.

Compounds represented by the structural formula given below constitute still another object of my invention. Other objects will become apparent hereinafter.

The compounds contemplated herein have the following structural formula:

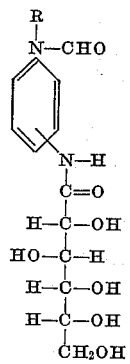

wherein R represents an alkyl group such as methyl, ethyl, propyl, butyl, etc., or an hydroxy-alkyl group such as hydroxy ethyl, hydroxy propyl, etc., and the amino nitrogen atom which is acylated is either meta or para with respect to the second amino nitrogen atom.

In accordance with my invention the amino N-alkyl (or N-hydroxyalkyl) formanilide is reacted with gluconic lactone to form the corresponding gluconyl derivative. The gluconic lactone is the ordinary gluconic delta-lactone which is the most readily available.

The reaction is carried out most advantageously by refluxing the two reactants in approximately molar proportions in a solvent for the particular formanilide derivative. During the refluxing step the gluconic lactone slowly dissolves as the reaction proceeds to completion. After the reaction has been completed, the hot reaction mixture is treated to remove impurities and by-products, after which the product is crystallized by the addition to the reaction mixture of a non-solvent or diluent such as iso-propanol.

The following examples will serve to illustrate further the manner of practicing my invention.

EXAMPLE 1

N-methyl, N-formyl, N'-gluconyl, p-phenylenediamine

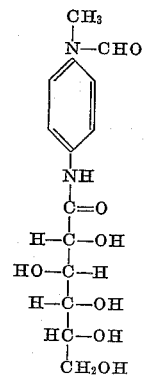

Fifty (50) grams of p-amino N-methyl formanilide is dissolved in about five hundred (500) ml. of methanol and then fifty-nine (59) grams of gluconic lactone are added. The mixture is refluxed for about eighteen (18) hours during which time the lactone slowly dissolves. The hot mixture is then treated with charcoal and filtered. This treatment removes all of the by-products which are primarily oxidation products of the phenylenediamines. The filtrate is then distilled to a small volume and five hundred (500) ml. of iso-propanol are then added slowly. The resulting crystallized product is filtered, washed with iso-propanol and dried.

The p-amino N-methyl formanilide employed in the above example is well-known and may be prepared in the manner set forth in U. S. P. 1,273,901.

EXAMPLE 2

N-ethyl, N-formyl, N'-gluconyl, p-phenylenediamine

This compound is prepared in a manner identical to that described above for the methyl homologue, starting with an equivalent amount of p-amino-N-ethyl formanilide.

EXAMPLE 3

N-methyl, N-formyl, N'-gluconyl, m-phenylenediamine

This compound is prepared identically as the compound of Example 1, except that the meta-amino, N-methylformanilide is employed. The latter compound may be prepared by treating the sodium salt of 3-nitro formanilide with methyl iodide and subsequently reducing the nitro group (see Beilstein, vol. 12, page 203).

EXAMPLE 4

N-ethyl, N-formyl, N'-gluconyl, m-phenylenediamine

This compound is prepared similarly as the methyl homologue of Example 3, starting with m-amino-N-ethyl formanilide.

The N-hydroxy-alkyl, N-formyl, N'-gluconyl, meta- and para-phenylenediamines are prepared in the same manner as the N-alkyl derivatives, employing in lieu of the amino-N-alkyl formanilides, the amino-N-hydroxyalkyl formanilides. The latter compounds may be prepared from the corresponding meta- or para-nitro N-hydroxyalkyl anilines by formylation and then reduction of the nitro group in the conventional manners. Among the more useful hydroxyalkyl groups are 2-hydroxyethyl and 3-hydroxypropyl.

The compounds prepared in accordance with my invention are valuable intermediates in the preparation of other organic compounds. The compounds of my invention are particularly valuable as solubilizing agents for ionic compounds in polar solvents. Specifically, the compounds of my invention are extremely effective for promoting the solubilization of the alkali metal salts of sulphuric acid esters of the leuco form of vat dyestuffs in aqueous mediums.

I claim:

1. A process for preparing compounds of the following structural formula:

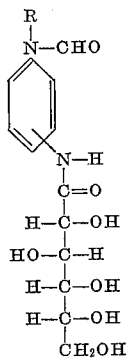

wherein R is selected from the group consisting of alkyl and hydroxy-alkyl radicals, and the acylated amino group is positioned in one of the positions meta and para with respect to the other amino group, which comprises reacting a compound selected from the group consisting of substituted meta- and para-phenylenediamines of the following formula:

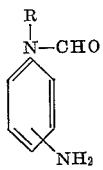

and wherein R is selected from the group consisting of alkyl and hydroxy-alkyl radicals with gluconic lactone.

2. A process for preparing N-methyl, N-formyl, N'-gluconyl, p-phenylenediamine which comprises reacting p-amino N-methyl formanilide with gluconic lactone.

3. A process for preparing N-methyl, N-formyl, N'-gluconyl, p-phenylenediamine which comprises refluxing a mixture of p-amino N-methyl formanilide and gluconic lactone in a solvent and separating the gluconyl derivative.

4. A process for preparing N-methyl, N-formyl, N'-glyconyl, p-phenylenediamine which comprises refluxing a mixture of p-amino N-methyl formanilide and gluconic lactone in methanol and separating the gluconyl derivative.

5. A process for preparing N-methyl, N-formyl, N'-gluconyl, p-phenylenediamine which comprises refluxing a mixture of p-amino N-methyl formanilide and gluconic lactone in a solvent and separating the gluconyl derivative by diluting the reaction mixture with a non-solvent for the gluconyl compound.

6. A process for preparing N-methyl, N-formyl, N'-gluconyl, p-phenylenediamine which comprises refluxing a mixture of p-amino N-methyl formanilide and gluconic lactone in a solvent and separating the gluconyl derivative by diluting the reaction mixture with iso-propanol.

7. A process for preparing N-ethyl, N-formyl, N'-gluconyl, p-phenylenediamine which comprises reacting N-ethyl formanilide with gluconic lactone.

8. A process for preparing N-methyl, N-formyl, N'-gluconyl, m-phenylenediamine which comprises reacting m-amino N-methyl formanilide with gluconic lactone.

9. A process for preparing N-(2-hydroxyethyl), N-formyl, N'-gluconyl, p-phenylenediamine which comprises reacting p-amino, N-(2-hydroxyethyl) formanilide with gluconic lactone.

10. A process for preparing N-(2-hydroxyethyl), N-formyl, N'-gluconyl, m-phenylenediamine which comprises reacting m-amino, N-(2-hydroxyethyl) formanilide with gluconic lactone.

11. Compounds selected from the group consisting of substituted meta- and para-phenylenediamines of the following formula:

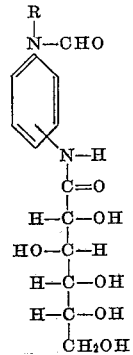

wherein R is selected from the group consisting of alkyl and hydroxy-alkyl radicals.

12. N-methyl, N-formyl, N'-gluconyl, p-phenylenediamine.

13. N-ethyl, N-formyl, N'-gluconyl, p-phenylenediamine.

14. N-methyl, N-formyl, N'-gluconyl, m-phenylenediamine.

15. A process for preparing compounds of the following structural formula:

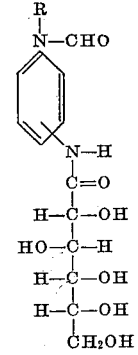

wherein R is selected from the group consisting of alkyl and hydroxy-alkyl radicals, and the acylated amino group is positioned in one of the positions meta and para with respect to the other amino group, which comprises refluxing in the presence of a solvent a compound selected from the group consisting of substituted meta- and para-phenylenediamines of the following formula:

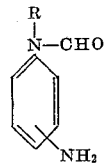

and wherein R is selected from the group consisting of alkyl and hydroxy-alkyl radicals with gluconic lactone.

References Cited in the file of this patent

UNITED STATES PATENTS

| | | |
|---|---|---|
| 1,273,901 | Morgan | July 30, 1918 |
| 1,901,565 | Pasternack et al. | Mar. 14, 1933 |
| 2,411,611 | Bergel et al. | Nov. 26, 1946 |